United States Patent Office 3,197,644
Patented July 27, 1965

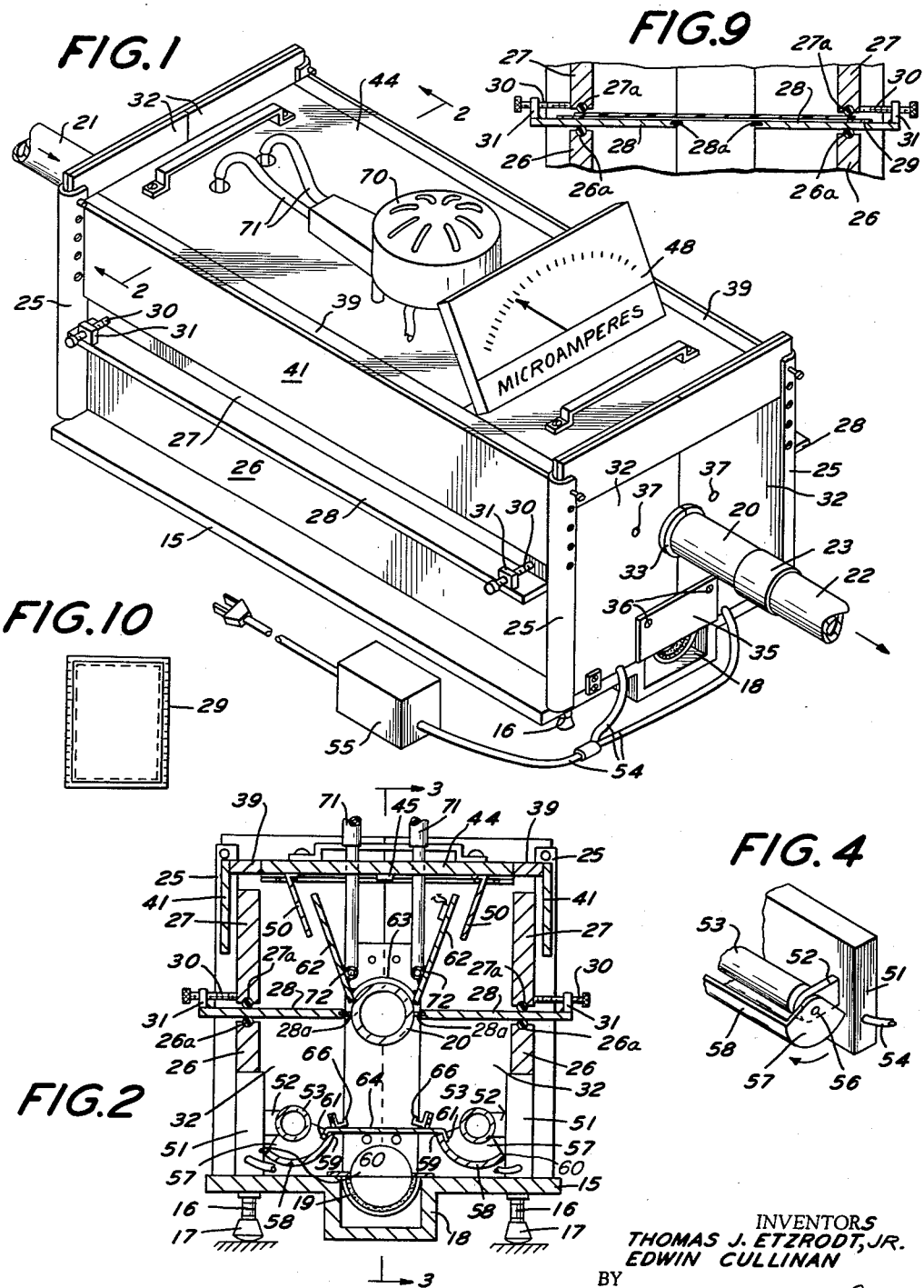
July 27, 1965    T. J. ETZRODT, JR., ETAL    3,197,644
PHOTOSENSITIVE APPARATUS FOR MEASUREMENT OF COLOR DENSITY
Filed Dec. 26, 1962    2 Sheets-Sheet 1
INVENTORS
THOMAS J. ETZRODT, JR.
EDWIN CULLINAN
ATTORNEY

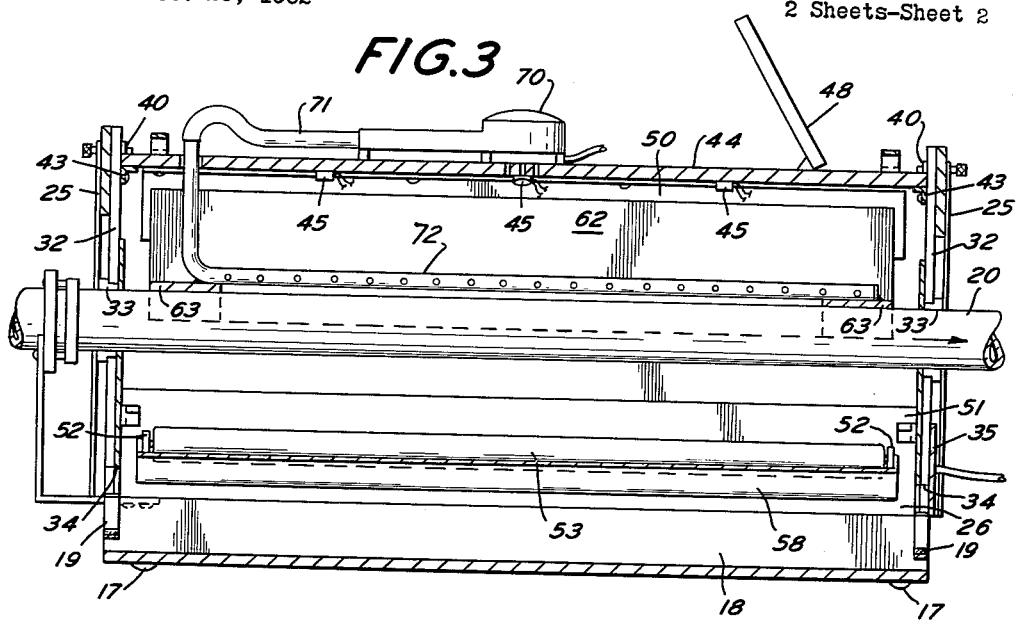
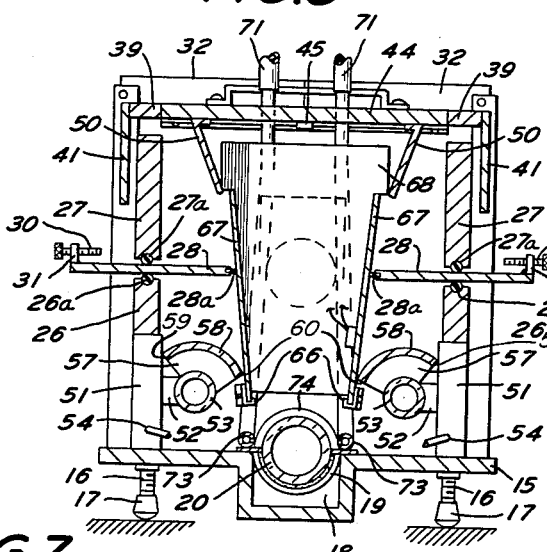
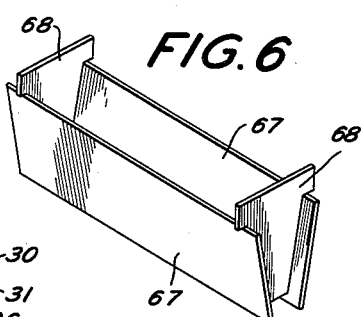
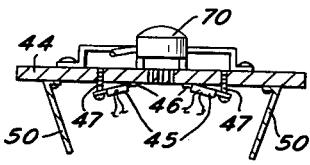
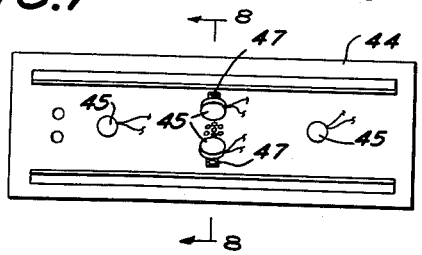

3,197,644
PHOTOSENSITIVE APPARATUS FOR MEASUREMENT OF COLOR DENSITY
Thomas J. Etzrodt, Jr., 951 Allengrove St., and Edwin Cullinan, 6862 Dicks Ave., both of Philadelphia, Pa.
Filed Dec. 26, 1962, Ser. No. 247,127
10 Claims. (Cl. 250—218)

This invention relates to apparatus for the measurement of color density which is particularly suited to measuring the color density of fluids, including liquids, slurries and gases, but can also be used for other purposes.

In our prior application for Letters Patent filed January 11, 1960, Serial No. 1683, now Patent No. 3,081,403, there is disclosed apparatus suited for but not limited to determining pigment density, particularly in connection with the quality control of printed webs or sheets. The present invention carries forward certain principles of our prior application which are advantageous in connection with the measurement of color density of liquids.

It is the principal object of the present invention to provide single but effective quality control apparatus for measuring the color density of fluids in motion.

It is a further object of the present invention to provide apparatus for measuring the color density of fluids in motion which will have a wide range of usefulness in connection with chemical processes and particularly where reliable information as to the color density of the fluid at a particular stage of the process is of importance for control of the process.

It is a further object of the present invention to provide apparatus for measuring the color density of fluids which is continuous in its action and thus avoids the necessity for spot check testing.

It is a further object of the present invention to provide quality control apparatus for measuring the color density of fluids which can be used for fluids at a wide range of temperatures and which is adapted to be quickly and easily mounted at the location where the measurement is to be made.

It is a further object of the present invention to provide quality control apparatus for measuring the color density of fluids which can be quickly and easily adapted for reflective or through light transmission as desired and dependent upon the color density of the liquid.

It is a further object of the present invention to provide quality control apparatus which is particularly adapted for measuring the color density of fluids in motion but which is also suitable for other color density measurement.

Other objects and advantageous features of the invention will be apparent from the description and claims.

The nature and characteristic features of the invention will be more readily understood from the following description, taken in connection with the accompanying drawings forming part thereof, in which:

FIGURE 1 is a view in perspective of quality control apparatus in accordance with the invention shown at one position for use;

FIG. 2 is a transverse vertical sectional view taken approximately on the line 2—2 of FIG. 1;

FIG. 3 is a longitudinal vertical sectional view taken approximately on the line 3—3 of FIG. 2 and showing the upper mounting location of the fluid flow tube;

FIG. 4 is a fragmentary perspective view showing the end mounting of one of the shields for the light tubes;

FIG. 5 is a view similar to FIG. 2 showing the lower mounting location of the fluid flow tube and different shield plates;

FIG. 6 is a view in perspective of the shield plates removed from the housing;

FIG. 7 is an underneath plan view on a smaller scale of the top housing plate;

FIG. 8 is a transverse sectional view taken approximately on the line 8—8 of FIG. 7;

FIG. 9 is a fragmentary transverse vertical sectional view taken approximately on the same plane as FIG. 2, showing the use of a sheet holder or frame; and FIG. 10 is a top plan view on a reduced scale of a sheet holder or frame for use in connection with the invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings in which a preferred embodiment of the invention is illustrated a base plate 15 is provided having a plurality of threaded legs 16 with feet 17 in threaded engagement therewith for leveling the base plate 15. The base plate 15 preferably has a channel 18 formed therein with supporting brackets 19 for a transparent scanning tube 20. The tube 20 is disposed in the lower position shown in FIG. 5.

The tube 20 also has an upper position as shown in FIG. 1.

The tube 20, in the selected position can be connected with fluid supply and delivery pipes 21 and 22 in any desired manner, such as by sleeves 23.

The base plate 15 has secured thereto and extending upwardly therefrom corner channels 25 of U-shape.

The channels 25 at each side have lower side wall panels 26 in engagement with the base plate 15 extending therebetween and upper side wall panels 27 extending therebetween. The lower side wall panels 26 and upper side wall panels 27 are spaced apart for the reception of horizontal shields 28, with gaskets 28a therealong and if desired, the sheet holding frame 29. The shields 28 can have gage screws 30 carried by brackets 31 for exact positioning thereof by engagement of the ends of the screws 30 with the upper side wall panel 27.

The upper edges of the lower side wall panels 26 and the lower edges of the upper side wall panels 27 are provided with sealing gaskets 26a and 27a, of rubber, felt, or the like, to prevent light leakage at this location.

The channels 25, at each end, are provided with end panel sections 32 which can be vertically slidably mounted in the channels 25 for removal to permit the assembly with the transparent tube 20 through which fluid whose density is to be measured is moving. The tube 20 can be mounted at an upper tube opening 33 or a lower tube opening 34 and an end closure panel 35 can be hung by pins 36 to cover the upper half of the lower end openings 34 or the pins 36 inserted in sockets 37 to close the upper end openings 33.

The end panel sections 32 have top panel sections 39 extending therebetween. The panel sections 39 can be secured to the panel sections 32 in any desired manner, such as by brackets 40. The panel sections 39 have downwardly extending side panels 41 secured thereto, the sections 39 being spaced above the upper side wall panels 27 and the side panels 41 being spaced outwardly from the side wall panels 27, for ventilation.

A top closure wall 44 is provided extending between the top panel sections 39 and the end panel sections 32 and supported in any desired manner such as by brackets 43 on the end panel sections 32.

The top closure wall 44 has mounted on the interior thereof at spaced locations a plurality of photocells 45. As shown these can include a pair of centrally located photocells 45 mounted on hinge strips 46 and adjustable as to tilt by adjusting screws 47, the other photocells 45 being fixedly located between the center and the ends of the top closure wall 44. The photocells 45 are preferably connected in parallel to generate an integrated electric current proportional to the incident light reaching or picked up by the photocells 45. The current from the photocells 45 is fed to an indicating or control device, an indicator 48 mounted on the outside of the closure wall 44 being shown. The indicator 48 can be calibrated in any desired manner for purposes of comparison.

The top closure wall 44 preferably has secured thereto, extending therealong and in converging relation outer side screen plates 50 of opaque material.

The lower side wall panels 26 have secured thereto elongated tube mountings 51 having built in transformers and starters (not shown) which include end brackets 52 for receiving longitudinally extending fluorescent tubes 53 which serve as light sources.

The tubes 53 can be energized in any desired manner such as by a conductor 54 connected through a voltage regulator 55.

The end brackets 52 have pivot pins 56 thereon for movably mounting end plates 57 of arcuate light reflecting shields 58 (see FIG. 4).

The sields 58 can be turned to lower limit positions as shown in FIG. 2 with margins 59 in engagement with the mountings 51 or to their upper limit positions as shown in FIG. 5 with their opposite margins 60 in engagement with the mountings 51.

If the transparent tube 20 is in its upper position as shown in FIG. 2, a pair of inwardly inclined light screen plates 62 are provided spaced and held at their lower ends contiguous to the end panel sections 32 by arcuate saddle strips 63. A transverse shield plate 64 extending from the end panel sections 32 at one end to the end panel sections 32 at the other end is also provided, having downturned side margins 61 hooked over the margins 59 of the shields 58. The shield plate 64 and shields 58 in this position for upward light transmission prevent downward light leakage. The horizontal shields 28 have their gaskets 28a in engagement with the tube 20.

The end panel sections 32 also have brackets 66 for the reception of the lower ends of inclined shield plates 67, if the transparent tube 20 is in its lower position as shown in FIG. 5. The shield plates 67 are held in separated position by end spacer 68 (see FIGS. 5 and 6) with the horizontal shields 28 urging them toward each other.

While the apparatus shown is satisfactory for many fluids if the fluid is cold with a tendency to cause condensate to collect on the tube 20 and interfere with the proper light transmission or transfer, a motor operated fan 70 can be provided, carried by the top closure wall 44 with conductor tubes 71 extending therefrom detachably connected to perforated delivery tubes 72 secured to the screen plates 62 and directing air onto the tube 20, if in its upper positions, or to perforated delivery tubes 73 carried on end saddle strips 74 and directing air onto the tube 20 in its lower position.

It will be noted that the shield plates 62 are in spaced relation to the screen plates 50, and that the shield plates 67 are in spaced relation to the screen plates 50 to permit ventilation.

The interiorly disposed surfaces other than those of the transparent tube 20, the photocells 45, and the reflecting shields 58 are preferably coated dead black to avoid undesired interior reflections and undesired light leakage.

The mode of use will now be pointed out.

Assume first that the fluid whose color density is to be tested is in a density range where light from the light sources provided by the tubes 53, is to be transmitted through the fluid in the tube 20.

The tube 20 is mounted at its upper position as shown in FIGS. 1, 2 and 3 with the light reflectors 58 positioned as shown in FIG. 2, and with the shield plate 64 in place.

The horizontal shields 28 have their sealing gaskets 28a engaging the tube 20 and the shield plates 62 are in position. An elongated vertical light transfer channel is thus provided with light from the source tubes 53 picked up by the photocells 45. The quantity picked up will be determined by the quantity transmitted and the fluid density.

If the fluid whose color density is to be tested is in a density range where the light from the light sources is to be directed onto the tube 20 and reflected therefrom the tube 20 is mounted in its lower position, as shown in FIG. 5. Light from the source tubes 53 and reflected by the reflector shields onto the tube 20 is directed upwardly between the shield plates 67 for pickup by the photocells 45.

The photocells 45 give an indication at the indicator 48 which is a measure of the color density.

If it is desired to determine the color density of a sheet or part thereof with the tube 20 removed, with the end openings 33 closed by the closure panel 35 and with the shield plates 62 in place, the frame 29 can be inserted from either side and positioned as shown in FIG. 9 and FIG. 10 and light transmitted therethrough.

We claim:

1. Apparatus for measuring color density of an article comprising a light proof housing having a base plate, side wall panels extending upwardly from said plate, end panel sections extending upwardly from said plate, a top closure for said housing including a top closure wall, a plurality of photoelectric cells mounted at horizontally spaced locations on said top closure wall for delivering an electrical current proportional to the light incident thereon, elongated illuminating sources mounted in the lower part of said housing interiorly of said side wall panels, a mounting device interiorly disposed in said housing for exposing the article whose color density is to be measured in a light path between said illuminating means and said photoelectric cells, and interiorly disposed screen plates extending downwardly with respect to said top closure wall and providing the side boundaries of a horizontally elongated light transfer passageway.

2. Apparatus for measuring color density as defined in claim 1 in which said end panel sections have opposite upper and lower openings for selective disposition of a transparent fluid conducting tube.

3. Apparatus for measuring color density as defined in claim 1 in which said end panel sections have opposite upper and lower openings for selective disposition of a transparent fluid conducting tube, and said elongated illuminating sources have light reflectors movably mounted with respect thereto for upward reflection when the tube is in the upper openings and downward reflection when the tube is in the lower openings.

4. Apparatus for measuring color density as defined in claim 1 in which said side wall panels have opposite horizontal openings, and horizontal shield plates are provided extending inwardly at said openings to the side boundaries of the light transfer passageway.

5. Apparatus for measuring color density as defined in claim 1 in which said side wall panels have opposite elongated horizontal openings, horizontal shield plates are provided extending inwardly at said openings and said shield plates are in abutting relation to said screen plates.

6. Apparatus for measuring color density as defined in claim 1 in which said mounting device is a transparent tube extending parallel to the side wall sections and beyond the end panel sections, said side wall panels have opposite elongated horizontal openings, and horizontal shield plates are provided extending inwardly at said openings in abutting relation to said tube.

7. Apparatus for measuring color density as defined in claim 1 in which a transparent fluid-conducting tube is provided in said housing, said end panel sections have opposite openings for the reception of said conducting tube, gaseous condensate-removing fluid delivery members are provided extending along said tube in spaced relation thereto, and a motor driven fan is provided for supplying gaseous fluid to said fluid delivery members.

8. Apparatus for measuring color density as defined in claim 1 in which said top closure is in spaced relation above said side wall panels and has downwardly extending side panels in spaced relation to said side wall panels for interior ventilation of said housing.

9. Apparatus for measuring color density as defined in claim 1 in which said top closure wall is removably mounted for access to the interior of said housing.

10. Apparatus for measuring color density as defined in claim 1 in which a member connected to said cells and responsive to current delivered thereby is mounted on said top closure wall.

References Cited by the Examiner

UNITED STATES PATENTS

| | | | |
|---|---|---|---|
| 2,149,735 | 3/39 | Henderson | 250—218 X |
| 2,710,715 | 6/55 | Gorham | 250—218 X |
| 2,831,920 | 4/58 | Furbush et al. | 250—238 X |
| 3,029,682 | 4/62 | Wood | 250—218 X |
| 3,081,403 | 3/63 | Etzrodt et al. | 250—239 |

RALPH G. NILSON, *Primary Examiner.*

WALTER STOLWEIN, *Examiner.*